3,804,792
FIRE RETARDANT PLASTICIZERS
R. Garth Pews, Midland, Mich., assignor to The Dow
Chemical Company, Midland, Mich.
No Drawing. Filed July 27, 1972, Ser. No. 275,467
Int. Cl. C08f 45/36
U.S. Cl. 260—31.6       7 Claims

ABSTRACT OF THE DISCLOSURE

Compounds having the general formula $$ROCH_2C(CH_2X)_2CH_2OR$$

wherein

R is the acyl radical of a carbonic or a saturated aliphatic monocarboxylic acid having from 2 to 6 carbon atoms free of substituents other than chlorine or bromine and each X is independently Cl or Br are excellent fire retarding plasticizers for vinyl chloride polymers, either alone or in combination with nonhalogenated plasticizers.

BACKGROUND OF THE INVENTION

Many of the halogenated materials that have been suggested for use as fire retardant additives have one or more serious defects that hinder their usage. In addition to cost availability, many have insufficient compatibility with the resin with which it is intended to be used. Others weaken or discolor the material. Among the most common and serious defects are thermal instability and deterioration by exposure to ultraviolet light.

Many vinyl chloride polymers are classified as non-burning because of their high chlorine content. Of these, polyvinyl chloride (PVC) is the most widely used. The major use of PVC, however, is in plasticized compositions where the plasticizer is used in amounts ranging up to greater than 100 parts of plasticizer per 100 parts of PVC. An important aspect of performance is the physical properties of the plasticized vinyl composition. These properties include compatibility, volatility, tensile strength, elongation, modulus at 100% elongation and hardness, among others, such as low migration and low extractability.

In most cases, the plasticizer is flammable and when compounded with PVC in amounts greater than 30–40 parts per 100 parts of PVC, the final composition may become flammable. Thus, fire retardant compositions can be obtained by the addition of antimony oxide to dioctyl phthalate plasticized PVC, but this has a disadvantage of producing nontransparent product. Phosphate esters also can be used as fire retardant plasticizers, but problems of volatility and permanence are presented. Chlorinated paraffins are sometimes used as extender plasticizers for the fire retardant effects, but have limited compatibility with PVC.

SUMMARY OF THE INVENTION

New compounds have now been found according to the present invention comprising biscarbonates and diesters of the general formula $$ROCH_2C(CH_2X)_2CH_2OR$$

wherein R is the acyl radical of a carbonic or a saturated, aliphatic monocarboxylic acid having from 2 to 6 carbon atoms free of substituents other than chlorine or bromine, and each X is independently Cl or Br.

It has also been found according to the present invention that the above diesters and biscarbonates are excellent fire retardant plasticizers for vinyl chloride polymers, either alone or in combination with nonhalogen-containing plasticizers, such as phthalates, phosphates, epoxy plasticizers, esters of aliphatic diacids, polyesters and the like. These novel compounds, physically incorporated into the vinyl chloride polymers, are compatible with the polymer and the many important applications of the plasticized vinyl chloride polymers that have been made possible by the use of polymeric plasticizers are retained and additionally the polymer is rendered fire retardant.

The preferred compounds of the invention are those wherein 2,2-bis(bromomethyl)-1,3-propanediol is reacted with ethyl chloroformate, chloroacetyl chloride, propionic anhydride, chloroacetic anhydride and α-chloropropionic anhydride. Other acidic anhydrides of up to 6 carbon atoms and having bromine or chlorine substituents are also of interest.

Other dihaloneopentyl alcohols are also extremely useful in the present invention. Thus, 2,2-bis(chloromethyl)-1,3-propanediol can be reacted as well as the mixed halogenated 2-bromomethyl 2-chloromethyl-1,3-propanediol. Such mixed halogenated alcohols and glycols are known. For example, the preparation of the mixed variety is outlined in F. Govaert and M. Beyaert, Natuurw. Tijdschr. 22, 73–4 (1940); C.A. 37, 3054[8] (1943); they are referred to in The Pentaerythritols, E. Berlow, R. H. Barth J. E. Snow, Reinhold Publishing Corp., New York, N.Y. (1958) at page 106.

The fire retardant plasticizers of the invention are prepared, inter alia, by known esterification reactions in which the appropriate saturated, aliphatic monocarboxylic acid anhydride or its counterpart is reacted with the diol. Representative examples of suitable acidic anhydrides for the reaction in addition to those mentioned above, are N-butyric, pentanoic and hexanoic anhydrides. Any of these anhydrides may contain at the time of the esterification reaction bromine or chlorine substituents. These do not materially derogate from the effectiveness of the final additive and indeed assist in the fire retardancy properties. The numbering and positioning of these halogen substituents are not critical.

Employing known esterification techniques, any of the compounds of the general formula of the invention can be prepared by a proper selection of the starting materials.

The second major aspect of the present invention is the incorporation of the fire retardant plasticizers of the invention into certain vinyl chloride polymers to give a fire retardant product having desirable physical and chemical properties. As noted above, this new fire retardant plasticizer can be added to the polymer either alone or in combination with nonhalogen-containing plasticizers. The additive of the invention will be more effective with some combinations than it is with others, but the desired effect can be obtained by the proper adjustment of the fire retardant concentration in the polymer.

Suitable vinyl chloride polymers are herein defined to include homopolymers and copolymers in which vinyl chloride is the major constituent wherein such copolymers contain at least 50 weight percent of vinyl chloride. The preferred vinyl chloride polymers are those which contain 70 weight percent or more vinyl chloride. Especially preferred is polyvinyl chloride (PVC) because of its demonstrated effectiveness in the invention.

The fire retardant plasticizers of the present invention may be incorporated into the vinyl chloride polymer by any of the usual methods. Thus, they and the polymer may be dissolved in a common solvent and recovered therefrom by evaporation of the solvent. More commonly, they are milled into the polymer, as, for instance, in a Banbury or a Brabender mixer. The polymer is then processed in its normal manner to give the desired end product.

The amount of the fire retardant plasticizer incorporated into the composition varies widely and is dependent upon the fire retardancy desired, and the desired physical properties of the plasticizer vinyl composition. Generally, however, when the compounds of the present invention are used alone with the vinyl chloride polymer, i.e., in the absence of other plasticizers, a desirable composition has about 30 to about 100 parts by weight per 100 of the vinyl chloride polymer, with amounts of about 40 to about 80 parts by weight being preferred. When a nonhalogenated plasticizer is introduced into the vinyl chloride polymer along with the compounds of the present invention, a desirable composition has about 20 to 70 parts by weight of the nonhalogenated plasticizer and about 20 to about 70 parts by weight of the compounds of the present invention, with the combined parts by weight of the two plasticizers comprising less than about 120 parts by weight, all parts by weight based on 100 parts by weight of the vinyl chloride polymer.

Of course, as the amount of the fire retardant plasticizers in the composition is increased, the properties of the resultant product are altered. By the use of the compounds of the invention, however, desirable fire retardant plasticized compositions can be prepared without materially affecting the other desirable properties of the polymer. Also, the fire retardancy per part by weight of the compounds of the present invention will depend on the particular compound of the invention employed.

It is to be understood that the particular compounds in the invention can be used singly or in combination with each other.

The nonhalogenated plasticizers, if used, can be any of the many polymeric plasticizers available which are formed by reacting alcohols or glycols with saturated dicarboxylic acids or simple esters such as di-2-ethylhexylphthalate (DOP).

SPECIFIC EMBODIMENTS

Example 1.—Propionic acid; 2,2-bis(bromomethyl)trimethylene ester 2,2-bis(bromomethyl) - 1,3 - propanediol (131 g., 0.5 mol) was slurried into refluxing benzene (300 ml.) containing 5 drops of concentrated $H_2SO_4$. Propionic anhydride (143 g., 1.10 mol) was added dropwise over a 30-minute period and the mixture refluxed for an additional 2.5 hours. On cooling, the benzene layer was washed with water, dilute $Na_2CO_3$, and dried over anhydrous sodium carbonate. The benzene was removed on a Buchi evaporator and the residue distilled on a Nester-Faust spinning band column. A fraction, B.P. 110–112 (0.05–0.10 mm.) was used for plasticizer evaluation.

Analysis.—Calculated for $C_{11}H_{18}O_4Br_2$ (percent): C, 35.38; H, 4.86; Br, 42.00. Found (percent): C, 35.57; H, 4.84; Br, 42.70.

Example 2.—Carbonic acid: 2,2-bis(bromomethyl)-trismethylene-diethyl ester 2,2-bis(bromomethyl) - 1,3 - propanediol (94 g., 0.36 mol) was dissolved in anhydrous pyridine (200 ml.), and ethyl chloroformate (108 g., 1.0 mol) was added dropwise while maintaining the temperature less than 40° C. with cooling. After the addition was complete, the pyridine hydrochloride that precipitated during the reaction was removed by filtration. The pyridine solution was diluted with benzene and the benzene extract washed with dilute HCl, dried and evaporated. The fraction used for plasticizer evaluation had a boiling point of 140–141° C. (0.3 mm.).

Analysis.—Calculated for $C_{11}H_{18}O_6Br_2$ (percent): C, 32.62; H, 4.47; Br, 39.46. Found (percent): C, 32.84; H, 4.37; Br, 40.9.

In order to provide suitable comparisons of the compounds of the present invention with nonhalogenated polyester plasticizers, flammability tests of PVC alone with DOP, with DOP and the compounds of Examples 1–3 and finally PVC and some of the compounds of the invention alone were made using the limited oxygen index test as outlined in ASTM D–2863. This test is described in T. L. Isaacs, "J. Fire and Flammability," 1, p. 36 (1970). The samples were compounded in a Brabender mixture at a temperature of 150–160° C. for 3–4 minutes. Test samples were molded in a compression test at 170–180° C. under 800–900 p.s.i. pressure and then stamped or cut from the pressed sheet.

The results are shown in Table I, below:

TABLE I

| Parts by weight of— | | | | | |
|---|---|---|---|---|---|
| PVC | DOP | Fire retardant | Percent Br | Percent Cl | LOI |
| 100 | 0 | 0 | 0 | 57.0 | 0.420 |
| 100 | 60 | 0 | 0 | 35.6 | 0.226 |
| 100 | 60 | 50 (Example 1) | 10.2 | 27.1 | 0.240 |
| 100 | 60 | 89 (Example 1) | 15.3 | 23.1 | 0.240 |
| 100 | 30 | 30 (Example 1) | 8.0 | 35.6 | 0.26 |
| 100 | 0 | 60 (Example 1) | 16.0 | 35.6 | 0.32 |
| 100 | 60 | 55 (Example 2) | 10.0 | 26.5 | 0.24 |
| 100 | 30 | 30 (Example 2) | 7.4 | 35.6 | 0.26 |
| 100 | 0 | 60 (Example 2) | 14.8 | 35.6 | 0.32 |
| 100 | 60 | 46 (Example 3) | 8.6 | 31.1 | 0.24 |
| 100 | 60 | 80 (Example 3) | 12.8 | 29.4 | 0.25 |
| 100 | 30 | 30 (Example 3) | 7.2 | 38.8 | 0.27 |

Similarly, 2,2-bis(bromomethyl)-1,3-propanediol is reacted under appropriate conditions with α-chloropropionic anhydride, butyric anhydride, pentanoic anhydride and hexanoic anhydride. Such acid anhydrides are also reacted having bromine and chlorine substituents thereon. Additionally, dichloroneopentyl glycol and chlorobromoneopentyl glycol is reacted with such anhydrides. Thus, a variety of compounds of the present invention are made which are effective fire retardant plasticizers used alone, in combination with one another and in combination with nonhalogenated plasticizers in vinyl chloride polymers.

Examples of such compounds are:

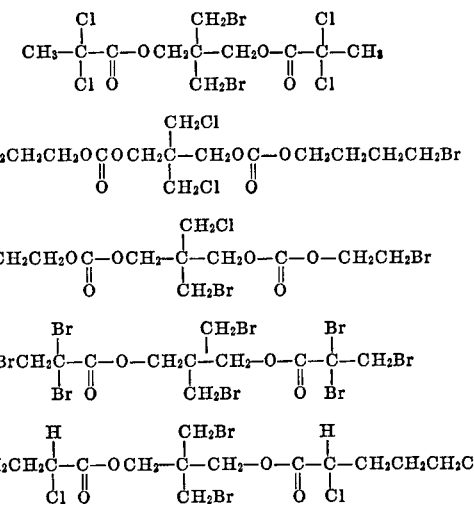

It is to be understood that other additives in minor amounts, such as thermal stabilizers, and the like, may be employed without departing from the scope of the present invention. Likewise, the enhancement of the fire retardancy of the compounds of the present invention by the addition of other known fire retardants such as antimony oxide, phosphate compounds, other halogen-containing materials, and the like, is contemplated herein.

I claim:

1. A composition of matter comprising a vinyl chloride polymer containing as the fire retardant plasticizer an effective amount of a compound of the formula $$R—O—CH_2C(CH_2X)_2CH_2—O—R$$

wherein R=

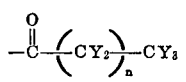

wherein n is an integer of 0 to 4 inclusive and each Y is independently H, Br or Cl and each X is independently Cl or Br.

2. The composition of matter of claim 1 wherein the fire retardant plasticizer is

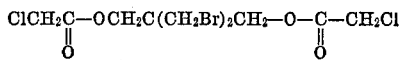

3. The composition of matter of claim 1 wherein the fire retardant plasticizer is from about 30 to about 100 parts by weight based on 100 parts by weight of the vinyl chloride polymer.

4. The composition of matter of claim 1 wherein the fire retardant plasticizer is from about 40 to about 80 parts by weight based on 100 parts by weight of the vinyl chloride polymer.

5. A composition of matter comprising a vinyl chloride polymer containing (a) as the fire retardant plasticizer an effective amount of the compound of claim 1 and (b) a nonhalogenated saturated polyester or ester plasticizer.

6. The composition of matter of claim 5 wherein (a) comprises from about 20 to about 70 parts by weight and (b) comprises from about 20 to about 70 parts by weight, the combined parts by weight of (a) and (b) comprising less than about 120 parts by weight, all parts by weight based on 100 parts by weight of the vinyl chloride polymer.

7. The composition of matter of claim 6 wherein the vinyl chloride polymer is polyvinyl chloride and (a) is

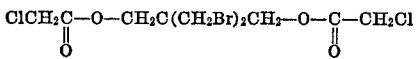

References Cited

UNITED STATES PATENTS

| | | | |
|---|---|---|---|
| 3,700,957 | 10/1972 | Daniels | 260—31.6 |
| 3,438,946 | 4/1969 | Lichstein | 260—487 |
| 3,300,543 | 1/1967 | Turner | 260—873 |
| 3,475,502 | 10/1969 | Hindersinn | 106—15 FP |
| 3,487,040 | 12/1969 | Jolles | 260—37 R |
| 3,688,001 | 8/1972 | Exner | 260—463 |
| 3,699,189 | 10/1972 | Downey | 260—873 |

OTHER REFERENCES

Modern Plastics Encyclopedia for 1970–1971, vol. 47, No. 10A, October 1970, p. 854.

MORRIS LIEBMAN, Primary Examiner

P. R. MICHL, Assistant Examiner

U.S. Cl. X.R.

260—32.2, 463, 488 J, DIG 24